United States Patent
Friedlander et al.

(10) Patent No.: US 10,025,564 B2
(45) Date of Patent: Jul. 17, 2018

(54) INTUITIVE FRAMES OF TASK APPROPRIATE FRAMES OF REFERENCE FOR MULTIPLE DIMENSIONS OF CONTEXT FOR RELATED SETS OF OBJECTS WITHIN AN IDE

(71) Applicant: INTERNATIONAL BUSINESS MACHINES CORPORATION, Armonk, NY (US)

(72) Inventors: Robert R. Friedlander, Southbury, CT (US); John K. Gerken, III, Apex, NC (US); James R. Kraemer, Santa Fe, NM (US); David M. Ungar, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/951,547

(22) Filed: Nov. 25, 2015

(65) Prior Publication Data
US 2017/0147295 A1    May 25, 2017

(51) Int. Cl.
*G06F 8/34* (2018.01)
*G06F 3/0484* (2013.01)

(52) U.S. Cl.
CPC ............. *G06F 8/34* (2013.01); *G06F 3/0484* (2013.01)

(58) Field of Classification Search
CPC ............ G06F 8/20–8/34; G06F 11/362; G06F 11/3664
USPC .......................................... 717/104–113, 129
See application file for complete search history.

(56) References Cited

U.S. PATENT DOCUMENTS

| | | | |
|---|---|---|---|
| 5,317,687 A * | 5/1994 | Torres | G06F 3/0481 715/823 |
| 5,734,905 A | 3/1998 | Oppenheim | |
| 5,760,788 A * | 6/1998 | Chainini | G06F 8/34 345/474 |

(Continued)

OTHER PUBLICATIONS

Balogh, G., et al., CodeMetropolis: Eclipse over the City of Source Code, 2015 IEEE 15th International Working Conference on Source Code Analysis and Manipulation (SCAM), Sep. 27-28, 2015, pp. 271-276, [retrieved on Apr. 1, 2018], Retrieved from the Internet: <URL:http://ieeexplore.ieee.org/>.*

(Continued)

*Primary Examiner* — Geoffrey St Leger
(74) *Attorney, Agent, or Firm* — Law Office of Jim Boice (57) ABSTRACT

A processor-implemented method, system, and/or computer program product generates and implements intuitively comfortable frames of task appropriate frames of reference for multiple dimensions of context constraints for related sets of objects within an integrated development environment (IDE). One or more processors identify a hierarchical set of context constraints for an object, and depict the hierarchical set of context constraints for the object on an IDE using a visual metaphor selected by a user. The processor(s) receive a zoom-in input for a first context constraint in the hierarchical set of context constraints, and place the IDE in mention mode, such that use of the hierarchical set of context constraints against the object is disabled. In response to the IDE being placed in mention mode, the processor(s) display detail of the first context constraint on the IDE, and receive changes to the first context constraint to create a modified first context constraint.

19 Claims, 7 Drawing Sheets

(56) References Cited

U.S. PATENT DOCUMENTS

| | | | |
|---|---|---|---|
| 7,272,826 B2* | 9/2007 | Bates | G06F 11/362 714/E11.207 |
| 2002/0029376 A1* | 3/2002 | Ambrose | G06F 8/20 717/113 |
| 2002/0124115 A1* | 9/2002 | McLean | G06F 9/451 719/310 |
| 2004/0225920 A1* | 11/2004 | Bates | G06F 11/362 714/38.13 |
| 2005/0198610 A1* | 9/2005 | Fildebrandt | G06F 8/38 717/100 |
| 2011/0072309 A1* | 3/2011 | Sakai | G06F 11/362 714/35 |
| 2011/0191303 A1* | 8/2011 | Kaufman | G06F 17/30286 707/684 |
| 2011/0271174 A1* | 11/2011 | Kissa | G06Q 10/10 715/230 |
| 2015/0106786 A1 | 4/2015 | Ossher et al. | |

OTHER PUBLICATIONS

Waguespack, L. J, Visual Metaphors for Teaching Programming Concepts, Proceedings of the twentieth SIGCSE technical symposium on Computer science education, pp. 141-145, Feb. 23-24, 1989, [retrieved on Apr. 1, 2018], Retrieved from the Internet: <URL:http://dl.acm.org >.*

P. Mell et al., "The NIST Definition of Cloud Computing", National Institute of Standards and Technology, Information Technology Laboratory, Sep. 2011, pp. 1-7.

Gary Marsden, Using Programming Tools in Virtual Environments, Jun. 6, 2001, University of Cape Town, Rondebosch, South Africa.

* cited by examiner

FIG. 7

INTUITIVE FRAMES OF TASK APPROPRIATE FRAMES OF REFERENCE FOR MULTIPLE DIMENSIONS OF CONTEXT FOR RELATED SETS OF OBJECTS WITHIN AN IDE

BACKGROUND

The present disclosure relates to the field of computer systems, and specifically to computers that support integrated development environments (IDEs). Still more specifically, the present disclosure relates to contextual constraints imposed on objects when developed in an IDE.

SUMMARY

A processor-implemented method, system, and/or computer program product generates and implements intuitively comfortable frames of task appropriate frames of reference for multiple dimensions of context constraints for related sets of objects within an integrated development environment (IDE). One or more processors identify a hierarchical set of context constraints for an object, and depict the hierarchical set of context constraints for the object on an IDE. The hierarchical set of context constraints is depicted by utilizing a visual metaphor selected by a user. The processor(s) receive a zoom-in input from the user. The zoom-in input is for a first context constraint in the hierarchical set of context constraints. In response to receiving the zoom-in input, the processor(s) place the IDE in mention mode, such that use of the hierarchical set of context constraints against the object is disabled while the IDE is in mention mode. In response to the IDE being placed in mention mode, the processor(s) display detail of the first context constraint on the IDE. The processor(s) then receive changes to the first context constraint that are input by the user from the IDE to create a modified first context constraint on the object.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
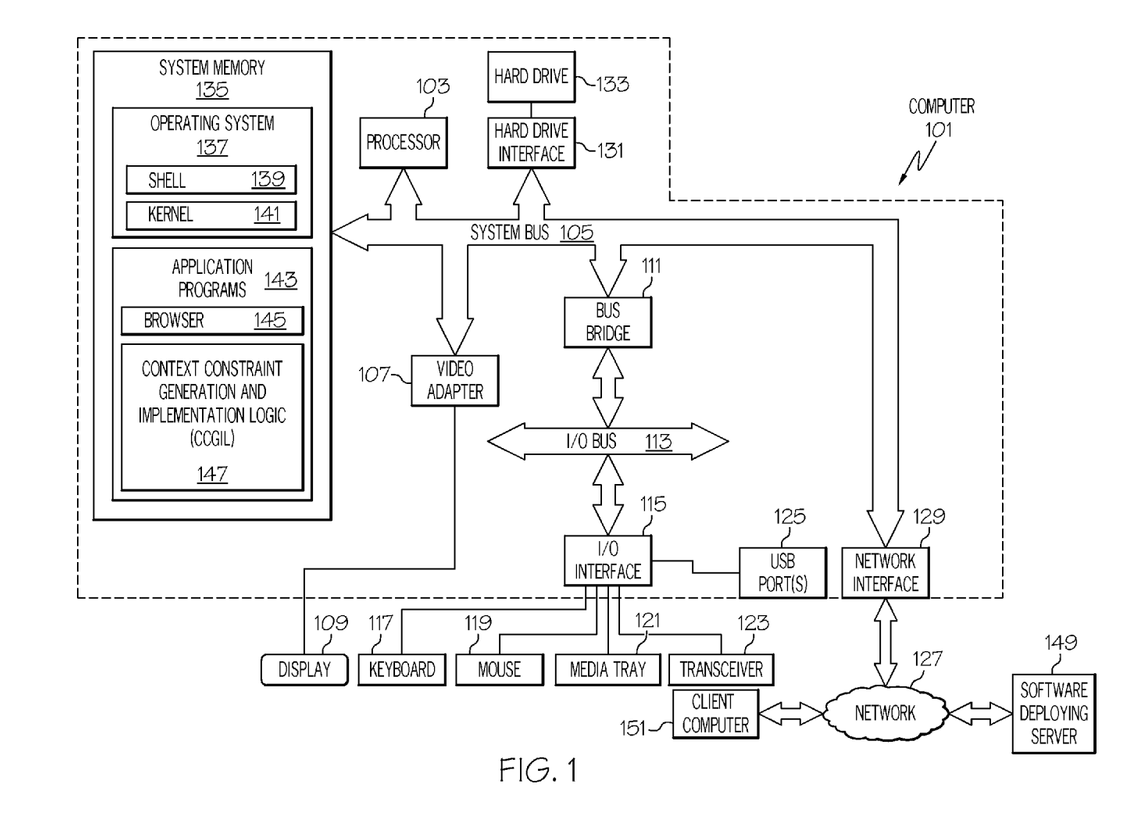
FIG. 1 depicts an exemplary system and network in which the present disclosure may be implemented.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 101 may be utilized by software deploying server 149 and/or client computer 151 and/or solution devices 153 shown in FIG. 1.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 118, a media tray 121 (which may include storage devices such as CD-ROM drives, multi-media interfaces, etc.), a transceiver 123 (capable of transmitting and receiving electromagnetic (e.g., radio frequency, near field communication—NFC signals, etc.) signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or client computer 151 and/or solution devices 153 using a network interface 129. Network interface 129 is a hardware network interface, such as a network interface card (NIC), etc. Network 127 may be an external network such as the Internet, or an internal network such as an Ethernet or a virtual private network (VPN).

A hard drive interface 131 is also coupled to system bus 105. Hard drive interface 131 interfaces with a hard drive 133. In one embodiment, hard drive 133 populates a system memory 133, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. Note that while shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other computer systems.

Application programs 143 in computer 101's system memory (as well as software deploying server 149's system memory) also include a Context Constraint Generation and Implementation Logic (CCGIL) 147. CCGIL 147 includes code for implementing the processes described below, including those described in FIGS. 2-4. In one embodiment, computer 101 is able to download CCGIL 147 from software deploying server 149, including in an on-demand basis, wherein the code in CCGIL 147 is not downloaded until needed for execution. Note further that, in one embodiment of the present invention, software deploying server 149 performs all of the functions associated with the present invention (including execution of CCGIL 147), thus freeing computer 101 from having to use its own internal computing resources to execute CCGIL 147.

Note that the hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Object-oriented programming may be adequate for ontologies with a single dimension of variation, but is inadequate when a second dimension is introduced. The object-oriented programmer can easily model a system with one dimension of variation using inheritance, but when faced with a second dimension has to resort to the visitor pattern, strategy pattern, and/or an aspect-oriented methodology. All such strategies incur the expense of weighing down the elegance of objects with additional concepts, and often at the expense of a potentially cumbersome and tricky refactoring of the code.

Context-oriented programming offers a way out by reifying behavioral differences in subsidiary dimensions as layers, and by adding implicit context to the state of a computation in order to select and utilize context layers. Thus, context-oriented programming enables context-dependent computation in context is inheritable, just as objects are inheritable.

The present invention provides the new and useful ability to generate frames of context across multiple dimensions of context, in order to generate and maintain contextual coherence with intuitive comfort. Task appropriate frames of multiple dimensions of context are associated with visual references for related sets of objects within an integrated development environment (IDE). The present invention builds frames of context (multiple dimensions at the task appropriate levels) for objects or variables. These are presented to the programmer with a choice of metaphors (i.e., how the user would like to "visualize" the contextual relationships), thus providing a unified view of the process that provides the related context of objects, either directly at the specific object or inherited from other objects, and at the task appropriate level. This image moves smoothly across related objects and enables automatic zooming in or out (with reference to specific context levels based on task).

In one or more embodiments of the present invention, the levels between the shared dimensions of context are not at the same levels of hierarchy but are still appropriate to the task at hand. The system, which allows for user override, is also able to learns task, user preferences, etc. to improve efficiency of operation. Thus, the present invention creates a system in which facets of context such as temporality, authority, precision, and/or operational environment are ever-present, but not ever-salient.

The present invention allows developers need to start simply, writing code that assumes typical defaults for facets of context such as temporality (i.e., the relationship of code/objects that are invoked at different times), authority (i.e., permission to access certain code/objects), precision (i.e., how different objects interact), and/or operational environment (e.g., what operating system and/or hardware platform must be used by the code) even though every line of the code executes in a fashion conditioned by all facets.

The present invention allows a developer to set, observe, and/or manipulate levels of context under which code is restricted. Thus, the present invention allows the developer to write code that is constrained by certain facets of context, or code that can manipulate its own execution context.

In one or more embodiments of the present invention allows the developer to call for the facets of context to be used, not mentioned, and for them to stay in the background. That is, context is "used" if the program/object conforms to the constraint identifies by the context. Context is "mentioned" if it is accessed for modification, but is not used by the program/object while it is being accessed for modification.

One or more embodiments of the present invention allows the facets of context to be both used and mentioned, and to shine brightly in the foreground on the IDE. As such, one or more embodiments of the present invention utilizes an IDE that is able to smoothly transition back-and-forth between "use" and "mention" as the developer moves from a context-oblivious task (i.e., the context is being used, even if not apparent to the developer) to a context-sensitive task (e.g., as the context is being mentioned for modification). If a particular developer needs to work on a lot of code that is context-specific, he or she will need the intended context to be easily seen but subtle, as provided by the present invention.

The terms "context" and "context constraint" are used interchangeably in the present disclosure.

The term "object" is defined as an executable file, including but not limited to an object oriented program (OOP) file An integrated development environment (IDE) is defined as a graphical user interface that allows a developer to write, execute, debug, and otherwise manipulate a software program.

Figure 2:
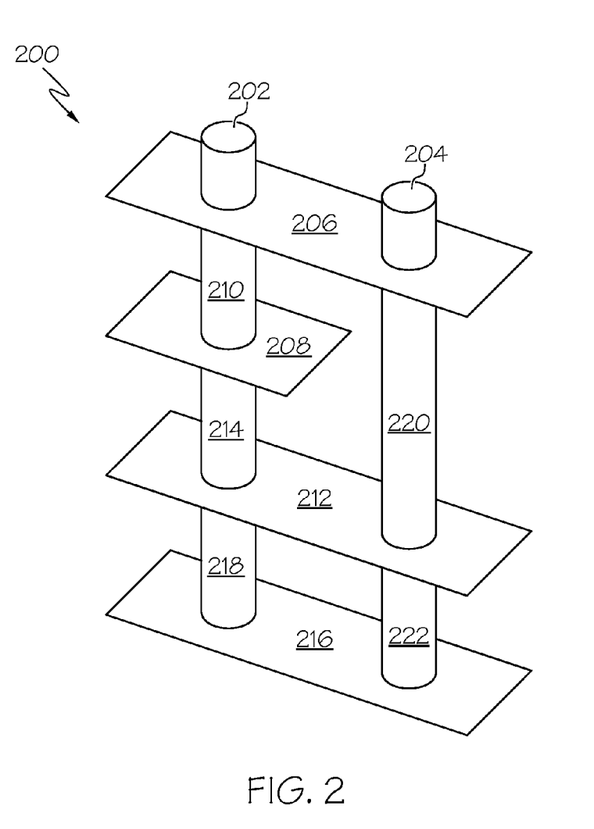
FIG. 2 illustrates an exemplary integrated development environment (IDE) depicting a hierarchy of context constraints.

With reference now to FIG. 2, an integrated develop environment (IDE) 200 depicts object 202 and object 204. IDE 200 provides a direct manipulation interface in which object 202 and object 204, as well as the context constraints (i.e., contexts 206, 208, 212, 216) in a hierarchical set of context constraints can be directly accessed and/or edited.

As shown in FIG. 2, object 202 and object 204 both are constrained by the same context 206. That is, object 202 and object 204 must conform to the context (temporal, permission, precision, operational environment, etc.) represented by as context 206. Furthermore, context, like executable objects, can have dependencies and/or inheritance.

For example, as shown in FIG. 2, when object 202 executes, it is constrained by context 206, which is dependent on context 208 (as depicted by pillar 210), which is dependent on context 212 (as depicted by pillar 214), which is dependent on context 216 (as depicted by pillar 218). For example, when object 202 executes, it may have to run on a certain application (represented by context 206), which must communicate via a particular system bus (represented by context 208) with a certain operating system (represented by context 212), which must run on a certain type of hardware (represented by context 216).

However, when object 204 executes, it also may have to run on a certain application (represented by context 206), but does not care about which system bus (represented by context 208) is used to communicate with the certain operating system (represented by context 212). Thus, pillar 220 goes directly from context 206 to context 212 for object 204, without sharing context 208 with object 202. Furthermore, when object 204 executes, the operating system represented by context 212 must run also on the certain type of hardware represented by context 216. Thus, the IDE 200 shows a pillar 222 going from context 212 to context 216.

Figure 3:
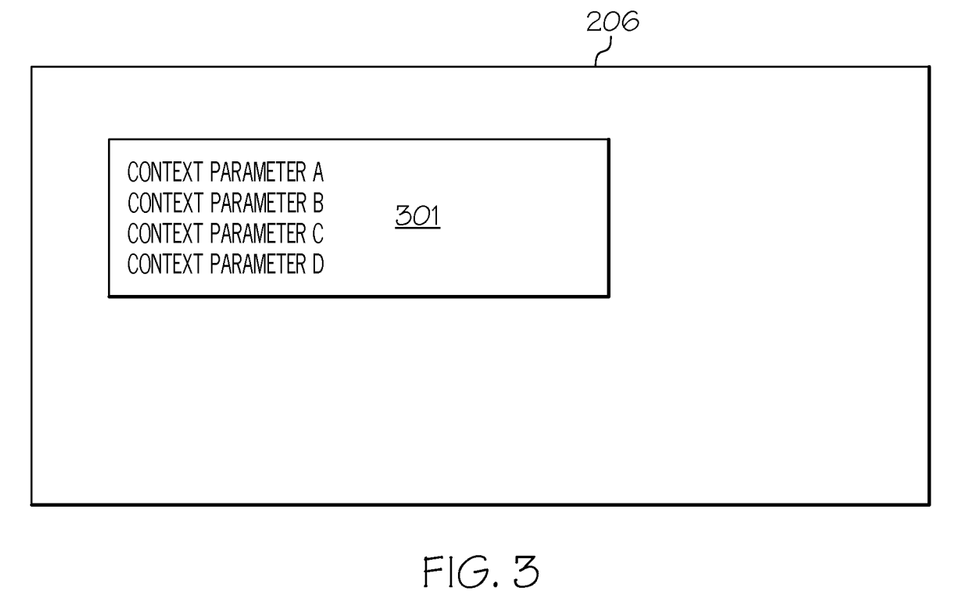
FIG. 3 depicts user-editable detail of a particular context constraint.

With reference now to FIG. 3, assume that a user has hovered a cursor above context 206 shown in FIG. 2. This causes a window 301 to pop up on an IDE, showing details of the contextual restraints (depicted as context parameters A-D) that apply to context 206. A user is able to edit context parameters A-D, which changes are recognized by the system and incorporated into the hierarchical set of context constraints depicted in FIG. 2.

Figure 4:
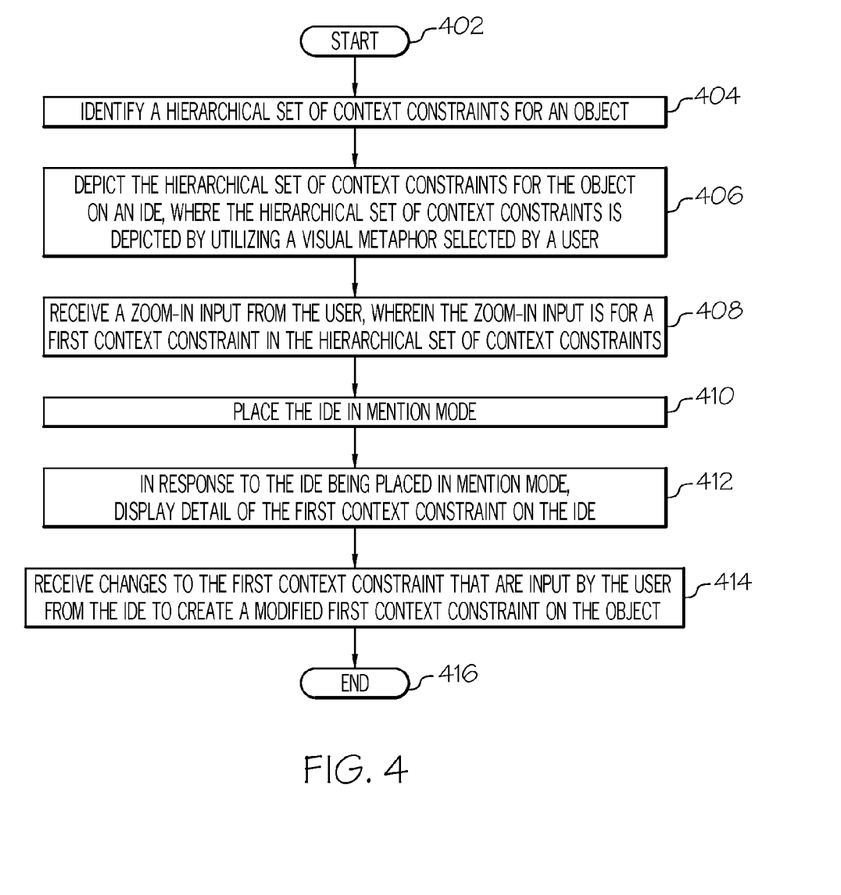
FIG. 4 is a high level flow chart of one or more steps performed by one or more processors and/or other hardware devices to generate and implement intuitively comfortable frames of task appropriate frames of reference for multiple dimensions of context constraints for related sets of objects within an integrated development environment (IDE) in accordance with one or more embodiments of the present invention.

With reference now to FIG. 4, a high level flow chart of one or more steps performed by one or more processors and/or other hardware devices to generate and implement intuitively comfortable frames of task appropriate frames of reference for multiple dimensions of context constraints for related sets of objects within an integrated development environment (IDE) in accordance with one or more embodiments of the present invention is presented.

After initiator block 402, one or more processors identify a first hierarchical set of context constraints for a first object, as described in block 404. This first hierarchical set of context constraints establishes parameters under which the first object must operate.

As describe in block 406, the processor(s) then depict the first hierarchical set of context constraints (e.g., contexts 206, 208, 212, 216 shown in FIG. 2) for the first object on the IDE (see FIG. 2). The first hierarchical set of context constraints is depicted by utilizing a visual metaphor selected by a user. In the example shown in FIG. 2, this user-selected metaphor uses "pillars" to show one context "supporting" another context, which provide a real-world intuitive example for that user. Another user, however, may use another real-world object to depict the relationship, such as floors on a building, etc.

As described in block 408, the processor(s) receive a first zoom-in input from the user. The first zoom-in input is for a first context constraint (e.g., context 206 shown in FIG. 2) in the first hierarchical set of context constraints. Note that the first context constraint may be, but is not necessarily, the context constraint that is at the top of the hierarchical set of context constraints.

As described in block 410, the processor(s), in response to receiving the first zoom-in input, place the IDE in mention mode, such that use of the first hierarchical set of context constraints against the first object is disabled while the IDE is in mention mode.

As described in block 412, in response to the IDE being placed in mention mode, the processor(s) display detail of the first context constraint on the IDE (see FIG. 3).

As described in block 414, the processors then receive changes to the first context constraint that are input by the user from the IDE to create a modified first context constraint on the first object. For example, context parameter A in FIG. 3 may be changed to a different context parameter A'.

The flow chart ends at terminator block 416.

In one embodiment of the present invention, the processor(s) depict a second hierarchical set of context constraints (e.g., contexts 206, 212, 216, but not 208, as shown in FIG. 2) required for a second object. As shown in FIG. 2, the second hierarchical set of context constraints is depicted by utilizing the same visual metaphor selected by the user on the IDE for the first hierarchical set of context constraints. As also shown in FIG. 2, the second hierarchical set of context constraints partially overlaps with the first hierarchical set of context constraints (i.e., context 208 is found in the first hierarchical set of context constraints for object 202 but is not found in the second hierarchical set of context constraints for object 204). The processor(s) then receive a second zoom-in input from the user, which is for a second context constraint in the second hierarchical set of context constraints, such that the zoom-in input causes detail of the second context constraint to be displayed on the IDE (similar to that shown in FIG. 3). The processor(s) then receive changes to the second context constraint that are input by the user from the IDE to create modified second context constraint on the second object.

In one embodiment of the present invention, the first zoom-input is caused by a user hovering a cursor over the first object (e.g., object 202). In another embodiment, the first zoom-input is caused by a user hovering a cursor over the context constraint (e.g., context 206). In the embodiment in which the first zoom-input is caused by the user hovering the cursor over the object being depicted in the IDE, then some or all of the contexts (e.g., contexts 206, 208, 212, 216) and their parameters are displayed on the IDE.

In one embodiment of the present invention, the processor(s) depict on the IDE all context constraints (e.g., contexts 206, 208, 212, and 216) from the first hierarchical set of context constraints that are being currently enforced against the first object that is presently executing.

In an embodiment of the present invention, the processor(s) conceal (from the IDE) all context constraints from the first hierarchical set of context constraints that are being currently enforced against the first object that is presently executing. These concealed context constraints are all concealed since the first object may be "context-oblivious" (i.e., the contexts are either fixed or have no significant impact on the object).

In an embodiment of the present invention, the processor(s) depicting on the IDE only a context constraint that is at a top of the first hierarchical set of context constraints while the first hierarchical set of context constraints are being currently enforced against the first object that is presently executing. That is, in one embodiment only context 206 is displayed on the IDE, while contexts 208, 212, and 216 shown in FIG. 2 are actually concealed (not displayed).

In an embodiment of the present invention, the processor(s) receive a message from the IDE indicating that the first hierarchical set of context constraints are transitioning from mention mode (in which they are editable but not available to constrain the objects) to use mode (in which they are activated to constrain the objects). In response to receiving the message from the IDE indicating that the first hierarchical set of context constraints have transitioned from mention mode to use mode, the processor(s) enable use of the first hierarchical set of context constraints when executing the first object to constrain the first object.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and improve resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
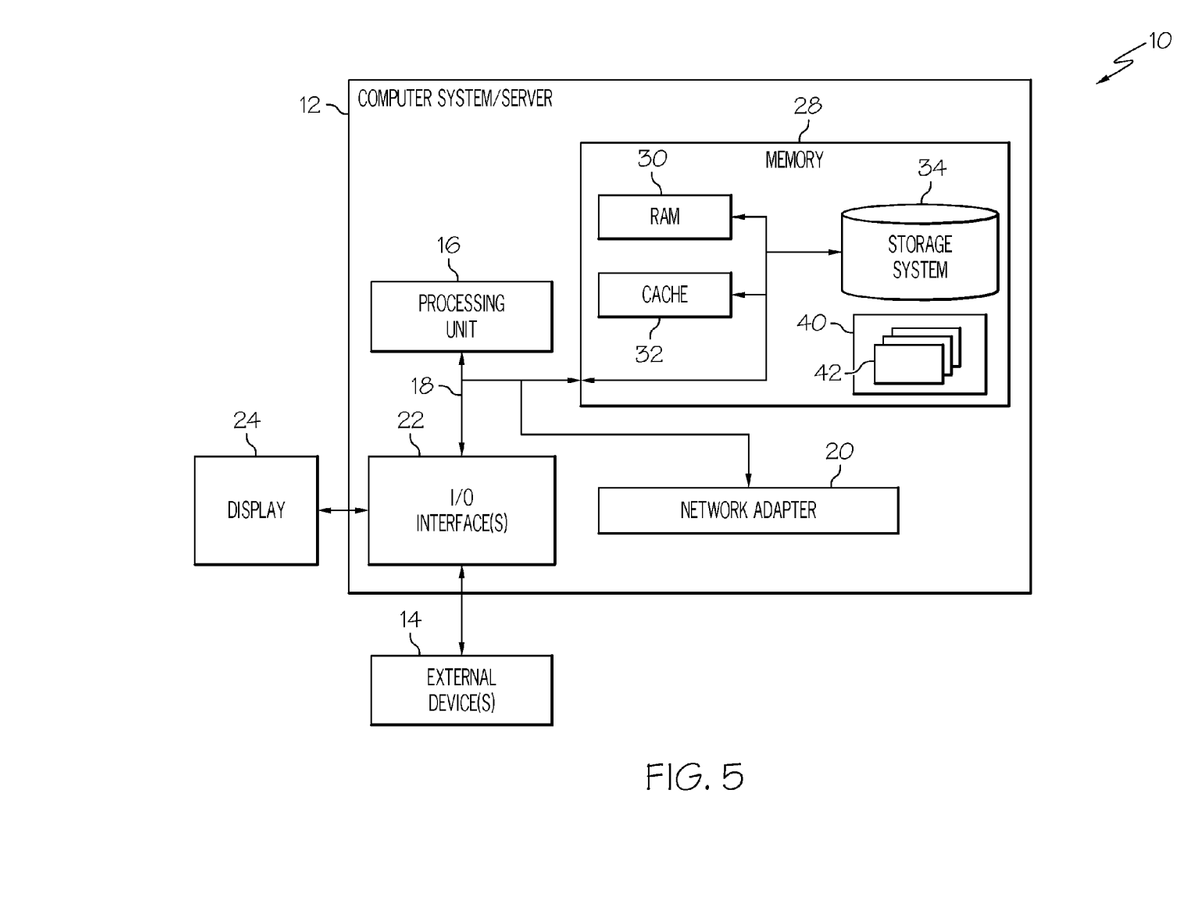
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
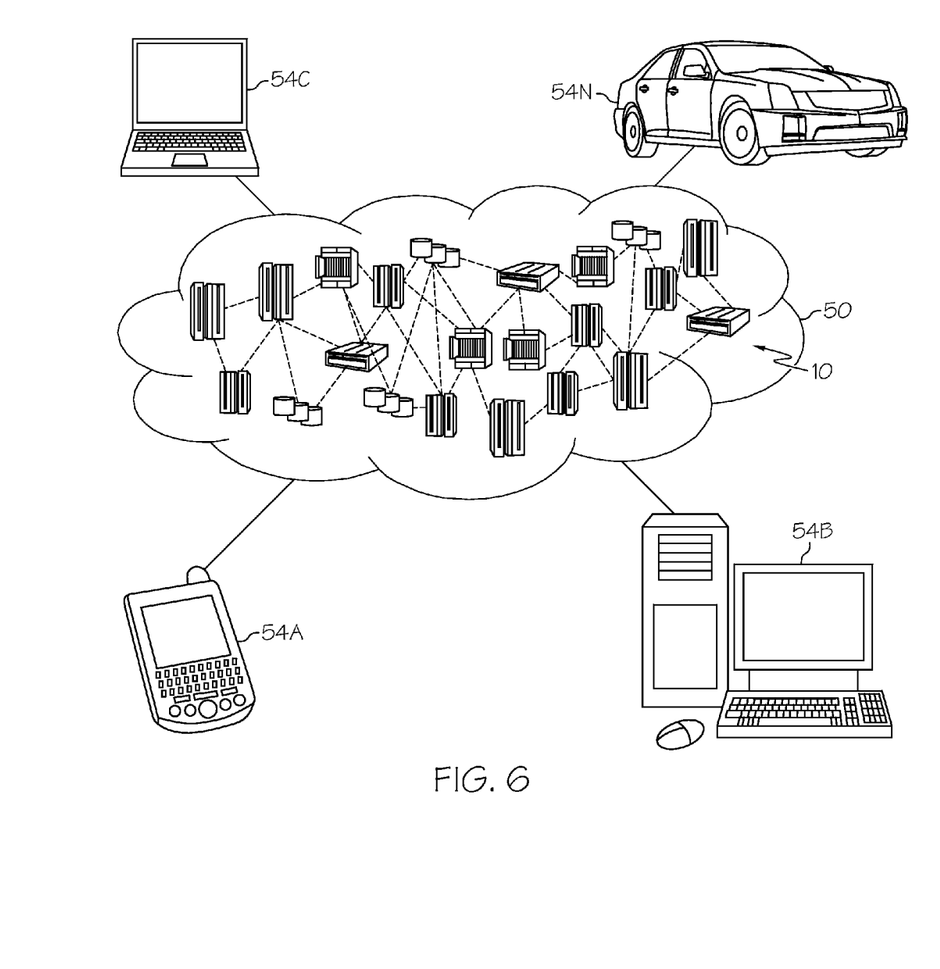
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
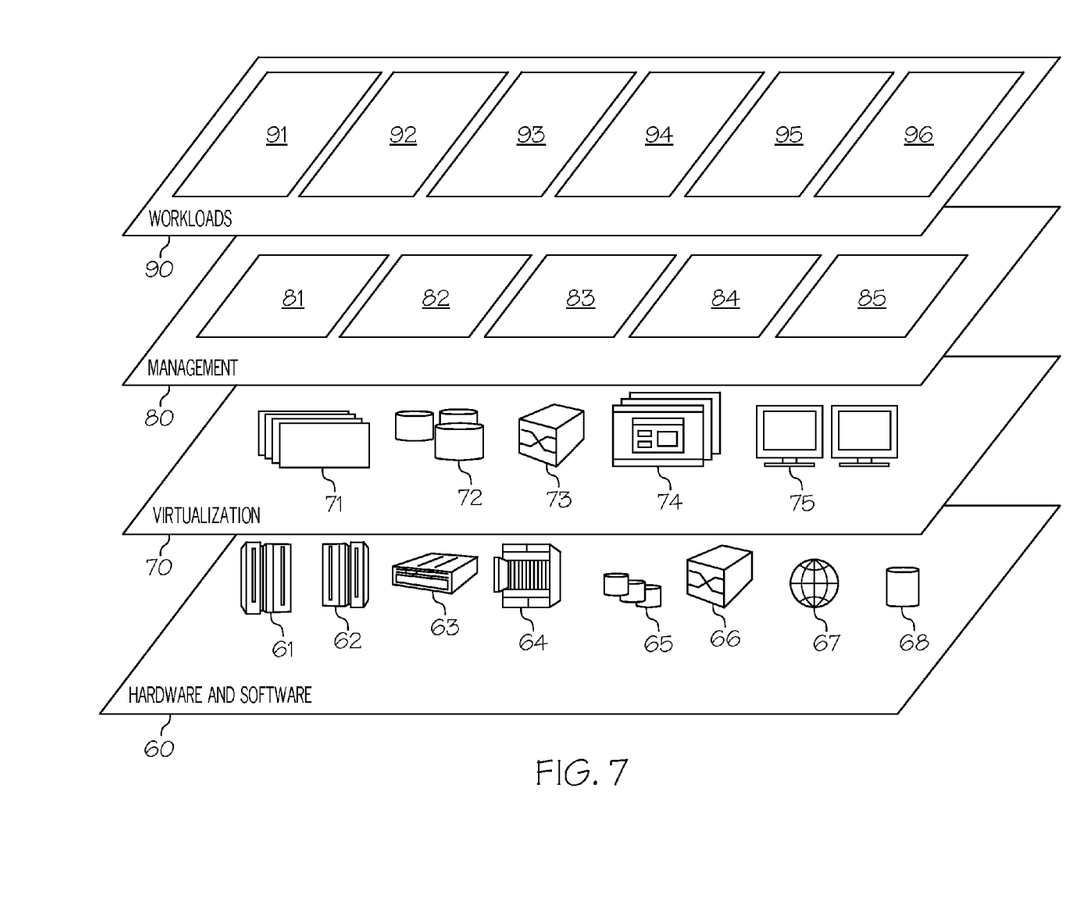
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context constraint generation and implementation processing 96 (for utilizing context constraints as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of generating and implementing intuitively comfortable frames of task appropriate frames of reference for multiple dimensions of context constraints for related sets of objects within an integrated development environment (IDE), the processor-implemented method comprising:
    identifying, by one or more processors, a first hierarchical set of context constraints for a first object, wherein the first hierarchical set of context constraints for the first object includes multiple facets of context, and wherein the multiple facets of context comprise an operational environment context describing an operating system and hardware platform that must be used by the first object;
    depicting, by one or more processors, the first hierarchical set of context constraints for the first object on the IDE, wherein the first hierarchical set of context constraints is depicted by utilizing a visual metaphor selected by a user, wherein the visual metaphor selected by the user is a hierarchical stack of planes and pillars, wherein a top plane represents a top context for the first object, wherein a pillar connects the top plane to a lower plane that represents a lower context for the first object, and wherein the lower context supports the top context just as the lower plane supports the top plane via the pillar;
    receiving, by one or more processors, a first zoom-in input from the user, wherein the first zoom-in input is for a first context constraint in the first hierarchical set of context constraints;
    in response to receiving the first zoom-in input, one or more processors placing the IDE in mention mode, wherein use of the first hierarchical set of context constraints against the first object is disabled while the IDE is in mention mode;
    in response to the IDE being placed in mention mode, displaying, by one or more processors, detail of the first context constraint on the IDE; and
    receiving, by one or more processors, changes to the first context constraint that are input by the user from the IDE to create a modified first context constraint on the first object.

2. The processor-implemented method of claim 1, further comprising:
    depicting, by one or more processors, a second hierarchical set of context constraints required for a second object, wherein the second hierarchical set of context constraints is depicted by utilizing the visual metaphor selected by the user on the IDE, and wherein the second hierarchical set of context constraints partially overlaps with the first hierarchical set of context constraints;
    receiving, by one or more processors, a second zoom-in input from the user, wherein the second zoom-in input is for a second context constraint in the second hierarchical set of context constraints, and wherein the second zoom-in input causes detail of the second context constraint to be displayed on the IDE; and
    receiving, by one or more processors, changes to the second context constraint that are input by the user from the IDE to create a modified second context constraint on the second object.

3. The processor-implemented method of claim 1, wherein the first zoom-input is caused by a user hovering a cursor over the first object.

4. The processor-implemented method of claim 1, further comprising:
    depicting, on the IDE and by one or more processors, all context constraints from the first hierarchical set of context constraints that are being currently enforced against the first object that is presently executing.

5. The processor-implemented method of claim 1, further comprising:
    concealing, on the IDE and by one or more processors, all context constraints from the first hierarchical set of context constraints that are being currently enforced against the first object that is presently executing.

6. The processor-implemented method of claim 1, further comprising:
    depicting, on the IDE and by one or more processors, only a context constraint that is at a top of the first hierarchical set of context constraints while the first hierarchical set of context constraints are being currently enforced against the first object that is presently executing.

7. The processor-implemented method of claim 1, further comprising:
    receiving, by one or more processors, a message from the IDE indicating that the first hierarchical set of context constraints are transitioning from mention mode to use mode; and
    in response to receiving the message from the IDE indicating that the first hierarchical set of context constraints have transitioned from mention mode to use mode, enabling, by one or more processors, use of the first hierarchical set of context constraints when executing the first object.

8. A computer program product for generating and implementing intuitively comfortable frames of task appropriate frames of reference for multiple dimensions of context constraints for related sets of objects within an integrated development environment (IDE), the computer program product comprising a non-transitory computer readable storage medium having program code embodied therewith, the program code readable and executable by a processor to perform a method comprising:
    identifying a first hierarchical set of context constraints for a first object, wherein the first hierarchical set of context constraints for the first object includes multiple facets of context, and wherein the multiple facets of context comprise an operational environment context describing an operating system and hardware platform that must be used by the first object;
depicting the first hierarchical set of context constraints for the first object on the IDE, wherein the first hierarchical set of context constraints is depicted by utilizing a visual metaphor selected by a user, wherein the visual metaphor selected by the user is a hierarchical stack of planes and pillars, wherein a top plane represents a top context for the first object, wherein a pillar connects the top plane to a lower plane that represents a lower context for the first object, and wherein the lower context supports the top context just as the lower plane supports the top plane via the pillar;
receiving a first zoom-in input from the user, wherein the first zoom-in input is for a first context constraint in the first hierarchical set of context constraints;
in response to receiving the first zoom-in input, placing the IDE in mention mode, wherein use of the first hierarchical set of context constraints against the first object is disabled while the IDE is in mention mode;
in response to the IDE being placed in mention mode, displaying detail of the first context constraint on the IDE; and
receiving changes to the first context constraint that are input by the user from the IDE to create a modified first context constraint on the first object.

9. The computer program product of claim 8, wherein the method further comprises:
depicting a second hierarchical set of context constraints required for a second object, wherein the second hierarchical set of context constraints is depicted by utilizing the visual metaphor selected by the user on the IDE, and wherein the second hierarchical set of context constraints partially overlaps with the first hierarchical set of context constraints;
receiving a second zoom-in input from the user, wherein the second zoom-in input is for a second context constraint in the second hierarchical set of context constraints, and wherein the second zoom-in input causes detail of the second context constraint to be displayed on the IDE; and
receiving changes to the second context constraint that are input by the user from the IDE to create a modified second context constraint on the second object.

10. The computer program product of claim 8, wherein the first zoom-input is caused by a user hovering a cursor over the first object.

11. The computer program product of claim 8, wherein the method further comprises:
depicting on the IDE all context constraints from the first hierarchical set of context constraints that are being currently enforced against the first object that is presently executing.

12. The computer program product of claim 8, wherein the method further comprises:
concealing from the IDE all context constraints from the first hierarchical set of context constraints that are being currently enforced against the first object that is presently executing.

13. The computer program product of claim 8, wherein the method further comprises:
depicting on the IDE only a context constraint that is at a top of the first hierarchical set of context constraints while the first hierarchical set of context constraints are being currently enforced against the first object that is presently executing.

14. The computer program product of claim 8, wherein the method further comprises:
receiving a message from the IDE indicating that the first hierarchical set of context constraints are transitioning from mention mode to use mode; and
in response to receiving the message from the IDE indicating that the first hierarchical set of context constraints have transitioned from mention mode to use mode, enabling use of the first hierarchical set of context constraints when executing the first object.

15. A computer system comprising:
a processor, a computer readable memory, and a non-transitory computer readable storage medium;
first program instructions to identify a first hierarchical set of context constraints for a first object, wherein the first hierarchical set of context constraints for the first object includes multiple facets of context, and wherein the multiple facets of context comprise an operational environment context describing an operating system and hardware platform that must be used by the first object;
second program instructions to depict the first hierarchical set of context constraints for the first object on an integrated development environment (IDE), wherein the first hierarchical set of context constraints is depicted by utilizing a visual metaphor selected by a user, wherein the visual metaphor selected by the user is a hierarchical stack of planes and pillars, wherein a top plane represents a top context for the first object, wherein a pillar connects the top plane to a lower plane that represents a lower context for the first object, and wherein the lower context supports the top context just as the lower plane supports the top plane via the pillar;
third program instructions to receive a first zoom-in input from the user, wherein the first zoom-in input is for a first context constraint in the first hierarchical set of context constraints;
fourth program instructions to, in response to receiving the first zoom-in input, place the IDE in mention mode, wherein use of the first hierarchical set of context constraints against the first object is disabled while the IDE is in mention mode;
fifth program instructions to, in response to the IDE being placed in mention mode, display detail of the first context constraint on the IDE; and
sixth program instructions to receive changes to the first context constraint that are input by the user from the IDE to create a modified first context constraint on the first object; and wherein
the first, second, third, fourth, fifth, and sixth program instructions are stored on the non-transitory computer readable storage medium for execution by one or more processors via the computer readable memory.

16. The computer system of claim 15, further comprising:
seventh program instructions to depict a second hierarchical set of context constraints required for a second object, wherein the second hierarchical set of context constraints is depicted by utilizing the visual metaphor selected by the user on the IDE, and wherein the second hierarchical set of context constraints partially overlaps with the first hierarchical set of context constraints;
eighth program instructions to receive a second zoom-in input from the user, wherein the second zoom-in input is for a second context constraint in the second hierarchical set of context constraints, and wherein the second zoom-in input causes detail of the second context constraint to be displayed on the IDE; and ninth program instructions to receive changes to the second context constraint that are input by the user from the IDE to create a modified second context constraint on the second object; and wherein the seventh, eighth, and ninth program instructions are stored on the non-transitory computer readable storage medium for execution by one or more processors via the computer readable memory.

17. The computer system of claim 15, wherein the first zoom-input is caused by a user hovering a cursor over the first object.

18. The computer system of claim 15, further comprising:
seventh program instructions to depict on the IDE all context constraints from the first hierarchical set of context constraints that are being currently enforced against the first object that is presently executing; and wherein the seventh program instructions are stored on the non-transitory computer readable storage medium for execution by one or more processors via the computer readable memory.

19. The processor-implemented method of claim 1, wherein the multiple facets of context further comprise a temporality context, an authority context, and a precision context, wherein the temporality context describes a relationship of code/objects that are invoked at different times, wherein the authority context describes a required permission to access certain code/objects, and wherein the precision context describes how precisely different objects interact.

\* \* \* \* \*